US007796551B1

(12) United States Patent
Machiraju et al.

(10) Patent No.: US 7,796,551 B1
(45) Date of Patent: Sep. 14, 2010

(54) PARALLEL ADAPTIVE QUANTILE WIRELESS SCHEDULER

(75) Inventors: Sridhar Machiraju, Oakland, CA (US); Soshant Bali, Lawrence, KS (US); Hui Zang, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 573 days.

(21) Appl. No.: 11/776,113

(22) Filed: Jul. 11, 2007

(51) Int. Cl.
 *H04L 5/22* (2006.01)
(52) U.S. Cl. .................. 370/330; 370/328; 370/348; 455/450; 455/451; 455/452; 455/453
(58) Field of Classification Search ............. 370/330, 370/329, 348; 455/450–453
See application file for complete search history.

(56) References Cited

U.S. PATENT DOCUMENTS

| 5,179,556 | A  | * | 1/1993  | Turner ........................ 370/233 |
| 5,946,324 | A  | * | 8/1999  | Mishra et al. ............... 370/468 |
| 6,055,437 | A  | * | 4/2000  | Riley et al. ................. 455/511 |
| 6,112,092 | A  | * | 8/2000  | Benveniste ................. 455/450 |
| 6,324,184 | B1 | * | 11/2001 | Hou et al. ................... 370/468 |
| 6,366,761 | B1 | * | 4/2002  | Montpetit ................. 455/12.1 |
| 6,870,808 | B1 | * | 3/2005  | Liu et al. .................... 370/203 |
| 7,162,249 | B2 | * | 1/2007  | Westphal .................... 455/450 |
| 7,274,676 | B2 | * | 9/2007  | Cardei et al. ............... 370/328 |
| 7,349,338 | B2 | * | 3/2008  | Balachandran et al. ...... 370/232 |
| 2003/0088682 | A1 | * | 5/2003 | Hlasny ....................... 709/229 |
| 2005/0090283 | A1 | * | 4/2005 | Rodriquez ............... 455/552.1 |
| 2005/0111406 | A1 | * | 5/2005 | Pasanen et al. ............. 370/329 |
| 2005/0111431 | A1 | * | 5/2005 | Gotesman et al. .......... 370/347 |
| 2006/0234704 | A1 | * | 10/2006 | Lee et al. .................... 455/434 |

OTHER PUBLICATIONS

A. Jalali et al., "Data Throughput of CDMA-HDR a High Efficency-High Data Rate Personal Communication Wireless System," IEEE 2000, pp. 1854-1858, San Diego, CA.
Daeyoung Park et al., "A New Wireless Packet Scheduling Algorithm based on the CDF of User Transmission Rates," GLOBECOM 2003, IEEE, pp. 528-532, Seoul National University.
Sem Borst et al., "Dynamic Rate Control Algorithms for HDR Throughput Optimization," IEEE INFOCOM 2001, pp. 976-985, Murray Hill, NJ.

(Continued)

*Primary Examiner*—Charles N Appiah
*Assistant Examiner*—Stamford Hwang

(57) ABSTRACT

A method, medium, and wireless system are provided for scheduling access terminals to prevent starvation of other access terminals connected to a communication network. The wireless system includes access terminals and base stations that are configured with a first wireless scheduler and a parallel wireless scheduler that select access terminals to communicate during specified time slots. The access terminals measure channel conditions associated with communications to the base station and transmit requests that specify a desired communication rate to the base station. The wireless schedulers on each base station receive the requests from each access terminal and select an access terminal to communicate during a subsequent time slot that may be based on, for example, the channel conditions and a combination of the probability estimates associated with the communication rate and a faction of unallocated slots or a second fraction—corresponding to the access terminal—generated by either the first wireless scheduler or the parallel wireless scheduler.

14 Claims, 5 Drawing Sheets

OTHER PUBLICATIONS

Thierry E. Klien et al., "Avoiding Spurious TCP Timeouts in Wireless Networks by Delay Injection," IEEE Communications Society, Globecom 2004, pp. 2754-2759.

Shailesh Patil et al., "Measurement-Based Opportunistic Scheduling for Heterogeneous Wireless Systems," 2006, pp. 1-13.

Harold J. Kushner et al., "Convergence of Proportional-Fair Sharing Algorithms Under General Conditions," IEEE Transactions on wireless Communications, vol. 3, No. 4, Jul. 2004, IEEE 2004, pp. 1250-1259.

T. Bonald, "A Score-Based Opportunistic Scheduler for Fading Radio Channels," France Telecom R&D, 7 pp., 2004.

Bali et a, "A Measurement Study of Scheduler-Based Attacks in 3G Wireless Networks," Passive and Active Measurement (PAM) conference, Louvain-la-neuve, Belgium, Apr. 2007, 10 pp.

* cited by examiner

PARALLEL ADAPTIVE QUANTILE WIRELESS SCHEDULER

Wireless systems are configured with channel-aware or channel-unaware wireless schedulers that provide network services to access terminals. The channel-unaware wireless schedulers are configured to ensure fair access to network services by providing equal access to the network services. The channel-unaware wireless schedulers, which do not monitor channel conditions, fail to maximize communication throughput at a base station, because the channel-unaware wireless schedulers may allocate access to an access terminal, when the access terminal is experiencing poor channel conditions and is unable to efficiently communicate with the base station. The channel-aware wireless schedulers overcome the shortcomings of the channel-unaware schedulers by monitoring channel conditions associated with each access terminal connected to the base station. The channel-aware wireless scheduler utilizes data about the channel conditions to schedule access terminals, when the channel conditions of the access terminal may support efficient transmission of communications between the base station and the access terminal.

The channel-aware schedulers maximize base station throughput when compared to the channel-unaware schedulers. However, channel-aware schedulers, are often not robust since they stop scheduling access terminals in favor of others. Such starvation happens, for example, when other access terminals communicate in an on-off fashion or begin to experience good channel conditions after a period of bad conditions and are compensated for not being scheduled.

SUMMARY

The present invention is defined by the claims below. Embodiments of the present invention solve at least the above problems by providing a wireless system, a method, and computer-readable media for, among other things, scheduling access terminals in a communication network to reduce starvation while maximizing throughput. The present invention has several practical applications in the technical arts including scheduling access terminals, executing a parallel wireless scheduler to prevent starvation of access terminals over a communication network based on estimated probabilities that are functions of the communication rate of the access terminals.

In a first aspect, a set of computer-useable instructions provide a method to schedule time slots for communications between access terminals and base stations. In accordance with the computer-useable instructions, the base stations receive requests from the access terminals. The requests also include a desired communication rate for the access terminals based on the current channel conditions observed by the access terminals. In turn, the base stations execute a first wireless scheduler and a parallel wireless scheduler, which uses estimated probabilities that are functions of the communication rate for each access terminal, to schedule an access terminal. The base stations schedule an access terminal for communication based on: a combination of the estimated probabilities, generated by the first wireless scheduler, that are functions of the communication rate; and a first fraction, generated by the first wireless scheduler, that is a function of a number of unallocated slots, and a second fraction, generated by the parallel wireless scheduler, that may be a function of the estimated probabilities. The parallel wireless scheduler reduces or eliminates starvation that results when channel-aware algorithms such as proportional fair are executed by the base stations.

In a second aspect, a wireless system includes base stations and access terminals that communicate over a communication network. Each base station comprises a first wireless scheduler, a parallel wireless scheduler, and a storage. The storage maintains variables associated with the estimated probabilities that are functions of the communication rate, a first fraction that is a function of a number of unallocated slots and previous time slots, and a second fraction that may be a function of the estimate probabilities. The variables associated with the first fraction and second fraction may be reassigned when one or more access terminals change from an off state to an on state.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
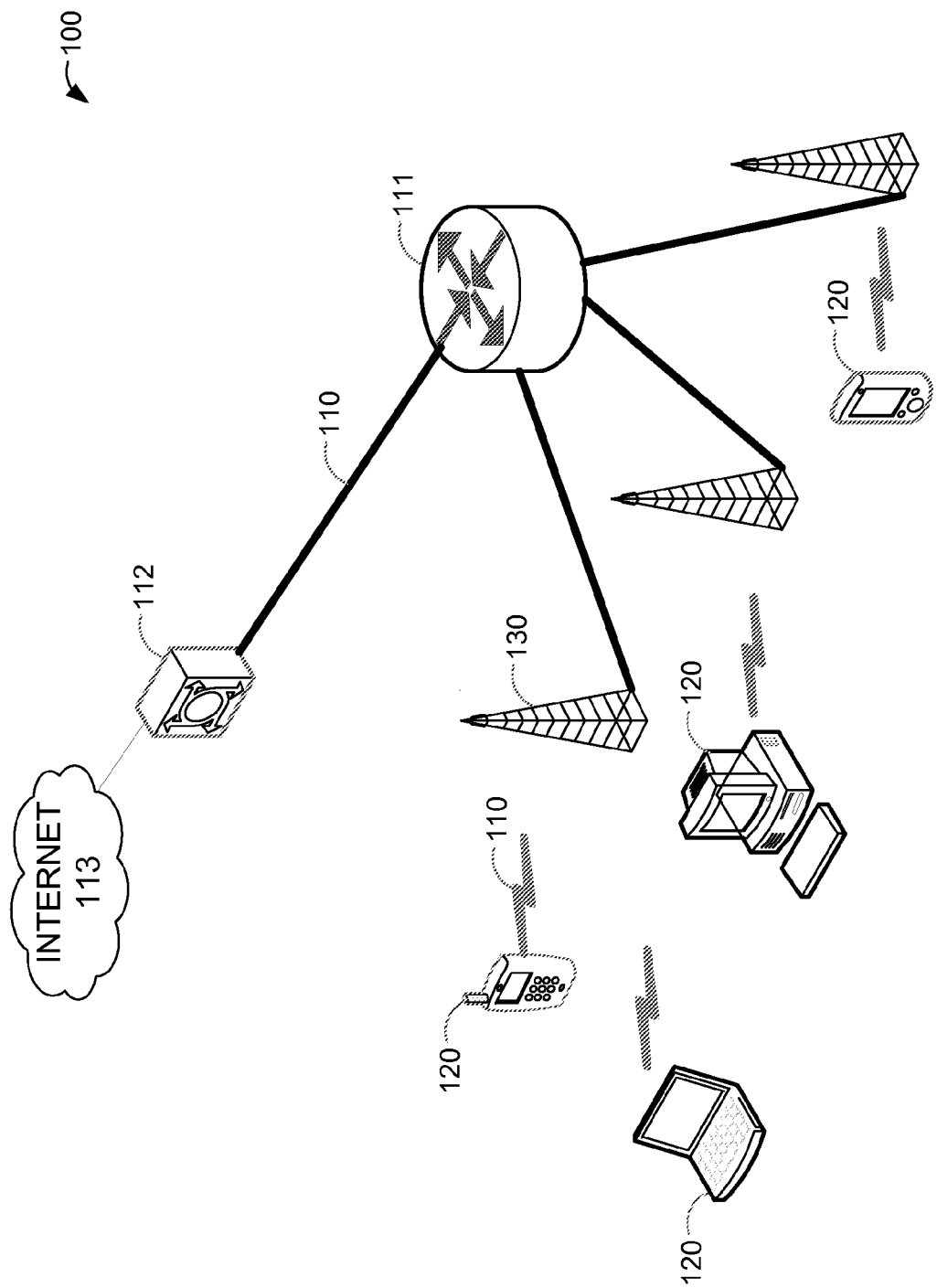
FIG. 1 is an exemplary network diagram that illustrates a wireless system.

Embodiments of the present invention provide wireless systems, media, and methods for scheduling access terminals to communicate over a communication network. A base station included in the wireless system is configured with a first wireless scheduler and a parallel wireless scheduler. The first wireless scheduler performs adaptive and quantile based scheduling. Because the first wireless scheduler perform quantile-based scheduling, the first wireless scheduler maintains a history of the channel conditions and communication rates associated with each access terminal and generates an estimated probability that is function of the communication rate. Additionally, because the first wireless scheduler performs adaptive scheduling, the first wireless scheduler, tracks a starvation time, i.e. a number of unallocated time slots associated with each access terminal to provide the access terminal with an appropriate priority. Accordingly, the adaptive and quantile based scheduling of the first wireless scheduler allows the base station to schedule an access terminal based on among other things, the combination of the estimated probability and the starvation time. In other embodiments, the base station executes a parallel wireless scheduler to protect the base station from bursty on-off traffic and corresponding starvation associated with bursty on-off traffic. The parallel wireless scheduler generates a second fraction that is utilized to reset the starvation time, corresponding to each access terminal, maintained by the first wireless scheduler, when one or more access terminals move from an off state to an on state.

Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, non-transitory computer-readable media comprise computer-storage media and communications media.

As utilized herein, parallel wireless scheduler is a wireless scheduler component of a base station that executes in parallel with a first wireless scheduler executed by the base station. The parallel wireless scheduler and the first wireless scheduler are similarly configured except the parallel wireless scheduler generates variables to calculate estimated probabilities that are functions of the communication rate associated with each currently-connected access terminal by assuming each currently-connected access terminal is a communication target or requested a communication rate.

A wireless system includes base stations, access terminals, and a communication network that connects the base stations and access terminals. In the wireless system, the base stations are configured with wireless schedulers that select time slots to assign to the access terminals. The wireless schedulers may include channel-aware schedulers that select access terminals based on, among other things, channel conditions observed by the access terminals and weighted average functions of the communication rate associated with each access terminal.

FIG. 1 is an exemplary network diagram that illustrates a wireless system 100. The wireless system 100 includes a network 110, access terminals 120, and base stations 130.

The network 110 may include wireless and wired networks. The network 110 comprises router 111, packet data switching node 112, and the Internet 113, or any other network locations. The base stations 130 communicate with the access terminals 120 over the wireless network 110. The base stations 130 connect to the router 111 to route communications received from the access terminals 120 to the Internet 113 and to route communications from the Internet 113 to the access terminals 120. The router 111 connected to the base station 130 receives communications destined for the Internet 113 or other network locations from the base stations 130 and receives communications destined for the access terminals 120 from the Internet 113. The router 111 forwards the communications to the packet data switching node 112 that is connected to the router 111. The packet data switching node 112 receives and formats the communications and sends the formatted communication to the Internet 113 or any other location specified in the communication 113 and vice versa.

The access terminals 120 are devices that generate or receive communication requests, i.e., voice, video, or data. The access terminals 120 include, but are not limited to, laptops, personal computers, mobile phones, personal digital assistants, smart phones, and other computing devices. The access terminals 120 monitor channel conditions on the network 110 and transmit the channel conditions to the base stations 130. The access terminals 120 also transmit requests that specify a desired communication rate based on the current channel conditions to the base station 130.

The base stations 130 receive the current channel conditions from the access terminals 120. The base stations 130 are configured with wireless schedulers that select access terminals 120 to communicate in a time slot based on the current channel conditions and estimated probabilities that are functions of the communication rate associated with each access terminal. The wireless schedulers maintain a distribution that correspond to achievable communication rates associated with the network 110. For instance, in some networks 110, i.e., evolution-data optimized (EV-DO) networks, only a specified number of rates, 10, are achievable. The n specified achievable rates may include $R_1$ to $R_n$. The base stations 130 may maintain the communication rate distribution for each access terminal as illustrated in Table 1 for an exemplary network 110 having three achievable rates.

TABLE 1

| Rate | Probability |
| --- | --- |
| $R_1$ | .2 |
| $R_2$ | .5 |
| $R_3$ | .3 |

The wireless scheduler generates, $p_i[t]$, the estimated probabilities that are functions of the achievable communication rates, $R_n$, associated with each access terminal 120 as: $p_i[t]= (1-\alpha)p_i[t-1]+\alpha$ when the ith access terminal 120 provides a request with a communication rate, $R_i[t]$, that is proximate to one or more of the achievable communication rates ($R_n$); and $p_i[t]=(1-\alpha)p_i[t-1]$ when the ith access terminal does not generate a request that includes a communication rate ($R_i[t]$). In some embodiments, $\alpha$ is a static value or a dynamic value chosen to maximize throughput.

Additionally, the base stations 130 are configured with storage devices that store the requested communication rate ($R_i[t]$) and the estimated probability $p_i[t]$ associated with each access terminal 120. To schedule an access terminal, the wireless scheduler may examine, for each access terminal, the requested communication rate ($R_i[t]$) and the distribution associated with the access terminal to locate a discrete range of achievable rates ($R_n$, $R_{n+1}$) that are proximate to the requested communication rate ($R_i[t]$). In turn, the wireless scheduler retrieves the estimated probabilities $p_{i,n}[t]$, $p_{i,n+1}[t]$) for the range of achievable rates ($R_n$, $R_{n+1}$) and randomly selects an estimated probability within the range of the estimated probabilities ($p_{i,n}[t]$, $p_{i,n+1}[t]$) as a quantile for each access terminal 120. In some embodiments, the wireless scheduler selects the access terminal 120 with the largest quantile to communicate in a subsequent time slot.

One of ordinary skill in the art appreciates and understands that the wireless system 100 has been simplified and that alternate arrangements are within the scope and spirit of the above description.

Figure 2:
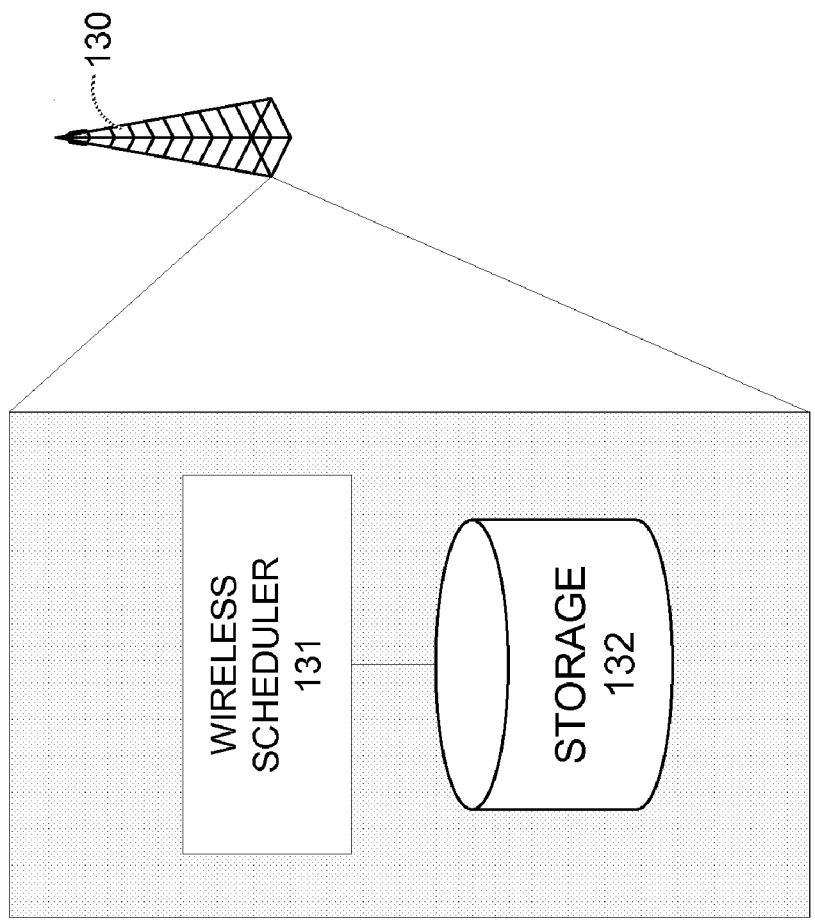
FIG. 2 is an exemplary component diagram that illustrates a base station included in the wireless system of FIG. 1.

FIG. 2 is an exemplary component diagram that illustrates a base station 130 included in the wireless system 100 of FIG. 1. The base station 130 includes a wireless scheduler 131 and storage 132.

The wireless scheduler 131 selects access terminals to communicate during time slots. In certain embodiments, the wireless scheduler 131 selects the access terminals based on, among other things, an estimated probability that is a function of the communication rate and a starvation time, i.e., a number of unallocated time slots associated with each access terminal. In addition to generating a quantile, as described above, the wireless scheduler 131 maintains a number of previous time slots for each access terminal and generates a fraction, $f_i[t]$, to represent the unallocated time slots. For each access terminal, the fraction ($f_i[t]$) provides a value that indicates the fraction of previous time slots not allocated to the ith access terminal.

When generating the fraction ($f_i[t]$), in some embodiments, the wireless scheduler treats access terminals that are not the target of any communications similar to access terminals not scheduled in a time slot. For example, the base stations 130 may maintain variables for, $f_i[t]$, the fraction of unallocated slots that is a function of the number of previous time slots associated with each access terminal 120 as: $f_i[t]=(1-\beta)f_i[t-1]+\beta$ when the ith access terminal 120 is not scheduled in slot t or is not the target of any communications; and $f_i[t]=(1-\beta)$ $f_i[t-1]$ when the ith access terminal 120 is scheduled in slot t. In some embodiments, $\beta$ is a static value or a dynamic value chosen to maximize throughput.

Accordingly, in certain embodiments, the wireless scheduler 131 may examine a combination of the quantile value and the fraction ($f_i[t]$) of unallocated time slots for each access terminal 120 to select the access terminal 120 with the largest combination. In some embodiments, the combination is evaluated by a summing component that provides the sum of the quantile value and the fraction ($f_i[t]$) for each access terminal.

Moreover, the wireless scheduler 131 stores information for each access terminal, which may include the desired communication rate in the storage 132. The storage 132 stores data for each access terminal that is connected to the base station 130. The storage 132 includes a database, queue, or any other data structure that stores information for each access terminal. The information stored by the storage 132 may include, but is not limited to, a requested communication rate, the estimated probabilities, the distribution of communication rates, and the fraction of unallocated time slots.

Figure 3:
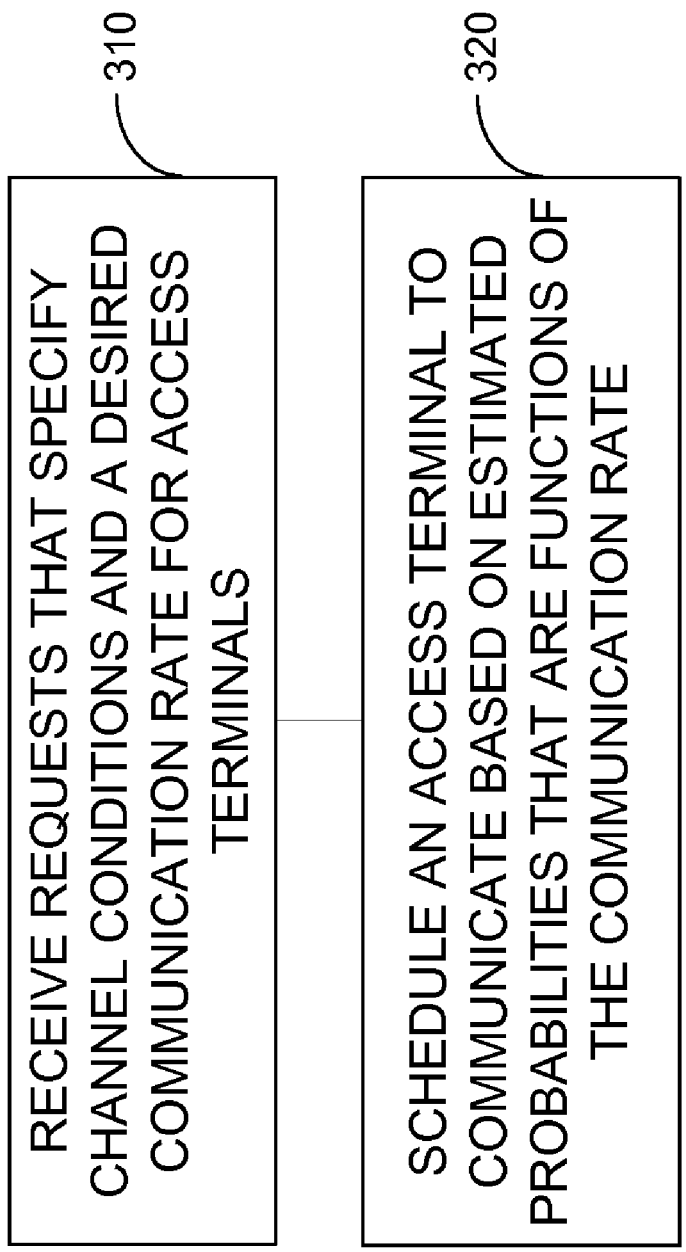
FIG. 3 is an exemplary logic diagram that illustrates a method for scheduling access terminals.

FIG. 3 is an exemplary logic diagram that illustrates a method for scheduling access terminals. Base stations communicate with the access terminals. In step 310, the access terminals may periodically transmit requests that specify a desired communication rate based on the current channel conditions observed by the access terminal. In turn, the base stations schedule an access terminal to communicate during a subsequent time slot based on, for example, the estimated probabilities that are functions of the communication rate associated with each access terminal, in step 320. In some embodiments, the wireless scheduler may evaluate a quantile value or a fraction of the unallocated time slots associated with each access terminal to select an access terminal for communication during a subsequent time slot. The base station communicates with the scheduled access terminal during the subsequent time slot.

The scheduling algorithm at the base stations starve access terminals in the presence of other access terminals receiving bursty on-off traffic because the wireless scheduler tries to compensate for not scheduling access terminals in the off state. To reduce or eliminate such starvation, the base stations are configured with a parallel instance of the same wireless scheduler in addition to the first instance. Based on both instances, the base station schedules and selects an access terminal to communicate during subsequent time slots.

Figure 4:
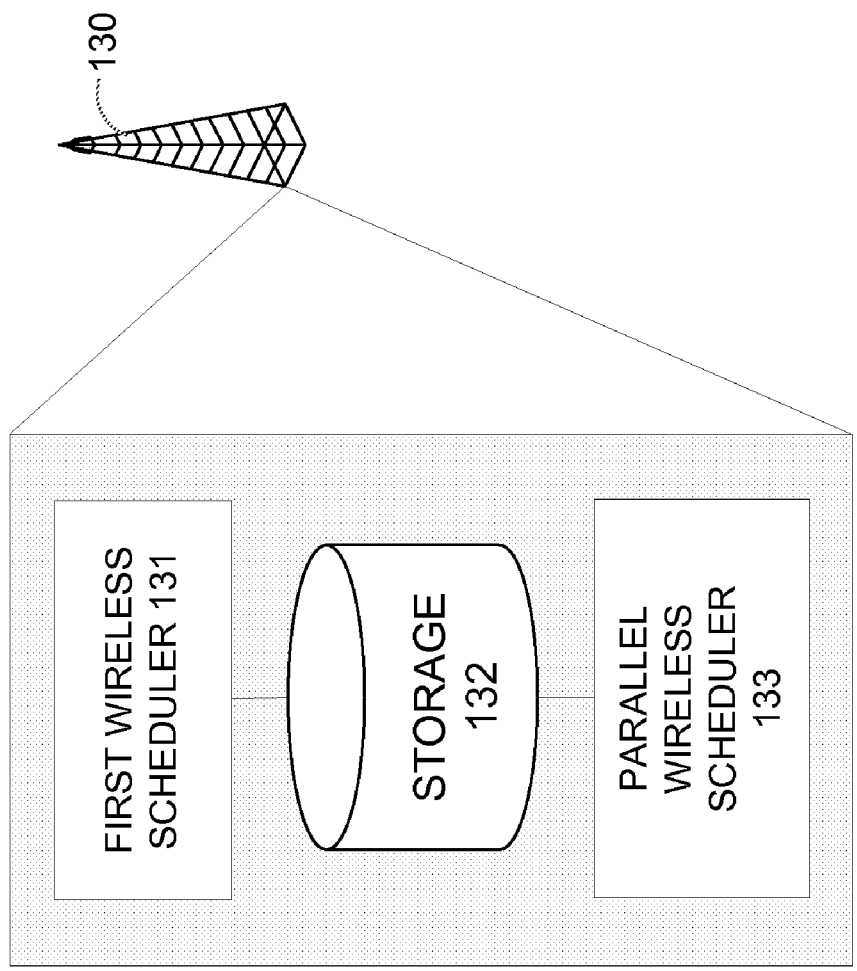
FIG. 4 is another exemplary component diagram that illustrates a base station included in the wireless system of FIG. 1.

FIG. 4 is an exemplary component diagram that illustrates the base station 130 included in the wireless system 100 of FIG. 1. The base station 130 includes the first wireless scheduler 131, the parallel wireless scheduler 133, and storage 132.

The first wireless scheduler 131 is configured to perform all scheduling for each access terminal connected to the base station 130. In each time slot, the first scheduler generates an estimated probability for each access terminal that requested a communication rate. For example, the first wireless scheduler 131 may generate variables to calculate an estimated probability, $p_i[t]$, that is a function of the communication rate for the ith connected access terminal by evaluating: $p_i[t]=(1-\alpha)p_i[t-1]+\alpha$ when the ith connected access terminal requests a desired communication rate ($R_i[t]$); or $p_i[t]=(1-\alpha)p_i[t-1]$ when the ith connected access terminal does not request a desired communication rate ($R_i[t]$). The decision to schedule is made, by the first wireless scheduler, in a channel-aware fashion such as, for example, choosing the access terminal with the maximum combination of the quantile, which is randomly selected from a range of estimated probabilities ($p_{i,n}[t]$, $p_{i,n+1}[t]$) for the range of achievable communication rates ($R_n$, $R_{n+1}$), and a fraction ($f_i[t]$) of unallocated time slots.

In certain embodiments, the first wireless scheduler 131 stores a flag for each connected access terminal to identify access terminals that are scheduled by the base station 130 to communicate during a subsequent time slot. When the flag associated of the connected access terminal is set, the first wireless scheduler 131 decreases the fraction ($f_i[t]$) of unallocated time slots as a function of the previous time slots for the connected access terminal. When the flag associated with the connected access terminal is not set, the first wireless scheduler 131 increases the fraction ($f_i[t]$) of unallocated time slots as a function of the previous time slots for the access terminal. In other words, the first wireless scheduler generates the fraction ($f_i[t]$) of unallocated time slots as a function of the previous time slots for the ith connected access terminal by evaluating: $f_i[t]=(1-\beta)f_i[t-1]+\beta$ when the flag is not set, which indicates the ith connected access terminal is not the target of communication, the ith connected access terminal does not have data to send, or the ith connected access terminal is not scheduled in slot t. Alternatively, the first wireless scheduler 131 generates the fraction ($f_i[t]$) of unallocated time as a function of the previous time slots for the ith connected access terminal by evaluating: $f_i[t]=(1-\beta)f_i[t-1]$ when the flag is set, which indicates the ith connected access terminal is scheduled in slot t and the ith connected access terminal is the target of communication.

The parallel wireless scheduler 133 is similar to the first wireless scheduler 131, except the parallel wireless scheduler 133 assumes all connected access terminals are always the target of communication. With a first wireless scheduler 131 as described above, for example, the parallel wireless scheduler 133 generates variables associated with calculating a second fraction $f_i^p[t]$ that is a function of the estimated probabilities, $p_i[t]$ for each connected access terminal. In each time slot, the access terminal with the highest combination of the quantile, which is randomly selected from a range of estimated probabilities ($p_{i,n}[t]$, $p_{i,n+1}[t]$) for the range of achievable communication rates ($R_n$, $R_{n+1}$), and the second fraction ($f_i^p[t-1]$) has its second fraction ($f_i^p[t]$) updated by evaluating $f_i^p[t]=f_i^p[t-1](1-\beta)$. This access terminal may not have data to be the target of communication with the base station. For all other connected access terminals—with data or without data—that do not have the maximum combination of the quantile and the second fraction ($f_i^p[t]$), the parallel wireless scheduler 133 generates variables for calculating the second fraction $f_i^p[t]$ that is a function of the estimated probabilities ($p_i[t]$), by evaluating $f_i^p[t]=f_i^p[t-1](1-\beta)+\beta$. In some embodiments, $\beta$ is a static value or a dynamic value chosen to maximize throughput.

Thus, the parallel wireless scheduler 133 assumes that all access terminals are always the targets of communication. In the above example, the parallel wireless scheduler 133 generates the second fraction that is a function of estimate probabilities for each access terminal in a manner that is calculated differently from the first fraction, generated by the first wireless scheduler, as a function of previous time slots. Moreover, when any one connected access terminal goes from an off state back to an on state, the storage maintained by the parallel wireless scheduler 133 is copied to the storage maintained by the first wireless scheduler 131 and the corresponding variable are reassigned. In certain embodiments, the flag associated with each access terminal is checked by the parallel wireless scheduler 133 to determine whether the access terminal is in the on state, i.e. the target of communication, and to reassign the variables. In the above example, the variables associated with first fraction ($f_i[t]$) that is a function of the previous time slots for each access terminal are assigned the values associated with the variables of the second fraction ($f_i^p[t]$) that is a function of the estimated probabilities for each access terminal.

The storage 132 is configured to store, among other things, the desired rate of communication, the variables maintained by the first wireless scheduler 131 and the parallel wireless scheduler 133. In certain embodiments, the parallel wireless scheduler 133 may access the storage 132 to re-assign the variables maintained by the first wireless scheduler 131.

In another embodiment, base stations are configured with the first and parallel wireless schedulers to select access terminals for communication during subsequent time slots. The base stations may receive requests that specify a desired communication rate from the access terminals. The first and parallel wireless schedulers both may use, among other things, channel conditions and desired communication rates to evaluate a first fraction and a second fraction that is a function of the estimated probabilities for the communication rates associated with each access terminals. The access terminal chosen by the first wireless scheduler is scheduled for communication during the subsequent time slot.

Figure 5:
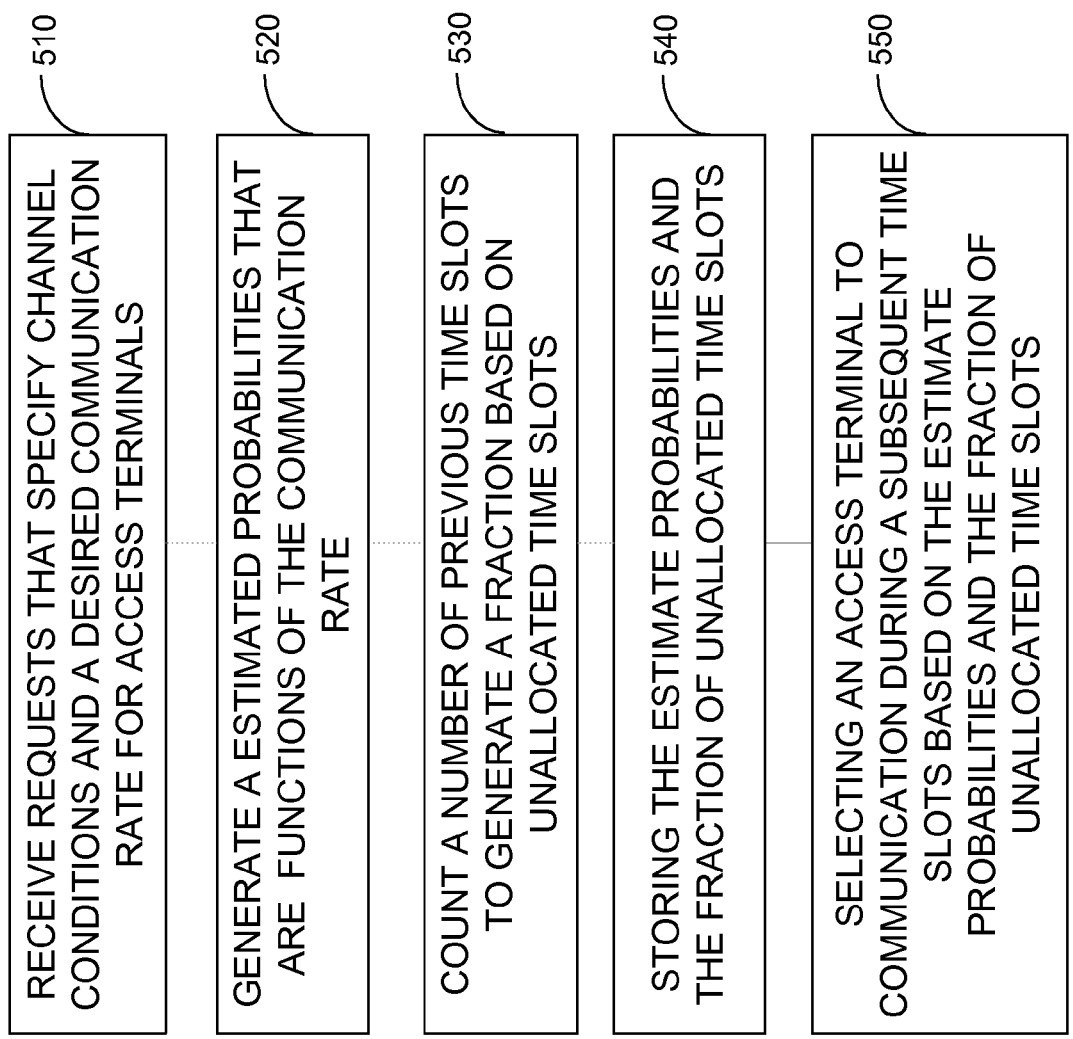
FIG. 5 is another exemplary logic diagram that illustrates a method for scheduling access terminals.

FIG. 5 is an exemplary logic diagram that illustrates a method for scheduling access terminals. Base stations configured with the first and parallel wireless schedulers communicate with the access terminals to receive communication requests from the access terminals. In step 510, the access terminals may periodically transmit requests that specify a desired communication rate and current channel conditions observed by the access terminal to the base stations. In step 520, the first wireless scheduler generates estimated probabilities for each access terminal. In some embodiments, the estimated probabilities are a function of the communication rates specified in the requests received in step 510. Similarly, the parallel wireless scheduler generates a second fraction that is a function of the estimated probabilities for each access terminal. In step 530, the first wireless scheduler counts a number of previous time slots, for each access terminal, to generate a first fraction that is based on a number of unallocated time slots. In step 540, the variables, for each access terminal, maintained by the first wireless scheduler and the parallel wireless scheduler, are stored to persist, among other things, the estimated probabilities, the first fraction, and the second fraction. In certain embodiments, the variables for the first fraction are reassigned with values for the second fraction, for each access terminal, when at least one access terminal enters an on state after being in an off state. In step 550, the base stations schedule an access terminal to communicate during a subsequent time slot based on the decision of the first wireless scheduler that may use, among other things, a combination of the estimated probabilities and the first fraction or the second fraction. The scheduled access terminal communicates with the base station during the subsequent time slot.

In summary, base stations are configured with the first wireless scheduler and an additional parallel wireless scheduler to reduce starvation caused in various scenarios. The parallel wireless scheduler is used to re-assign the variables maintained by the first wireless scheduler. The first wireless scheduler chooses the access terminal to schedule in each time slot after any necessary re-assignment of its variables by the parallel scheduler.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method to schedule time slots for communication associated with an access terminal, the method comprising:

receiving a request for a communication rate with one or more access terminals at a specified interval;

generating an estimated probability based on the communication rate for each access terminal;

counting a number of previous time slots to generate a first fraction that is based on a number of unallocated time slots for each access terminal;

storing, for each access terminal, the estimated probability and the first fraction of unallocated time slots;

selecting an access terminal, having a maximum value when evaluating a combination of the estimated probability and the first fraction that is based on the number of unallocated time slots, to communicate during a subsequent time slot;

for each access terminal, generating a second fraction based on the estimated probability associated with each access terminal; and increasing the second fraction of the access terminal having a maximum combined value of a quantile estimated probability and the second fraction.

2. The media of claim 1, wherein the first fraction based on the number of unallocated time slots decreases when the access terminal is allocated a time slot.

3. The media of claim 1, wherein the estimated probability and the first fraction of unallocated slots are generated by a first wireless scheduler.

4. The media of claim 3, wherein the selected access terminal is chosen based on evaluations performed by the first wireless scheduler.

5. A wireless base station configured with a processor to perform a method for scheduling access terminals, the method comprising:

receiving a request for a communication rate with one or more access terminals at a specified interval;

generating an estimated probability based on the communication rate for each access terminal via a first wireless scheduler;

counting a number of previous time slots to generate a first fraction that is based on a number of unallocated time slots for each access terminal via the first wireless scheduler;

storing, for each access terminal, the estimated probability and the first fraction of unallocated time slots;

selecting an access terminal, having a maximum value when evaluating a combination of the estimated probability and the first fraction that is based on the number of unallocated time slots, to communicate during a subsequent time slot;

for each access terminal, generating a second fraction based on the estimated probability associated with each access terminal and storing the second fraction, wherein the second fraction is generated by a parallel wireless scheduler; and increasing the second fraction of the access terminal having a maximum combined value of a selected estimated probability and the second fraction, and decreasing the second fraction of all remaining access terminals.

6. The method of claim 5, wherein the selected access terminal is chosen based on evaluations performed by the first wireless scheduler.

7. The method of claim 5, wherein the first fraction of unallocated time slots is reassigned using the second fraction maintained by the parallel wireless scheduler.

8. The method of claim 7, where the second fraction is assigned to the first fraction when an access terminal moves from an off state to an on state.

9. A wireless system to schedule time slots for access terminals, the wireless system comprising:

one or more access terminals to communicate over a communication network;

one or more base stations, each base station comprises a first wireless scheduler and a parallel wireless scheduler configured to select an access terminal from the one or more access terminals to communicate over the communication network for each time slot based on estimated probabilities and a first fraction generated by the first wireless scheduler; and a storage device to store, for each time slot, the estimated probabilities generated by the first wireless scheduler, the first fraction generated by the first wireless scheduler and a second fraction generated by a parallel wireless scheduler for each access terminal;

wherein the first fraction of the first wireless scheduler is re-assigned using the second fraction of the parallel wireless scheduler.

10. The wireless system of claim 9, wherein the one or more base stations are channel-aware.

11. The wireless system of claim 9, wherein the one or more access terminals send requests that specify a desired communication rate to the base station.

12. The wireless system of claim 9, wherein one or more of the access terminals includes one of a laptop, a personal computer, a mobile phone, a personal digital assistant, or a smart phone.

13. The wireless system of claim 9, wherein one or more of the access terminals generate or receive bursty traffic or experience good channel conditions after a period of bad channel conditions.

14. The wireless system of claim 13, wherein the bursty traffic is packet traffic.

* * * * *